United States Patent
Cheng et al.

(10) Patent No.: US 7,636,227 B2
(45) Date of Patent: Dec. 22, 2009

(54) NOISE IMMUNE OVER CURRENT PROTECTION WITH INHERENT CURRENT LIMITING FOR SWITCHING POWER CONVERTER

(75) Inventors: Xiao-chang Cheng, San Jose, CA (US); Jun Honda, El Segundo, CA (US); Gabriele Bernardinis, Marina del Rey, CA (US)

(73) Assignee: International Rectifier Corporation, El Segundo, CA (US)

( * ) Notice: Subject to any disclaimer, the term of this patent is extended or adjusted under 35 U.S.C. 154(b) by 99 days.

(21) Appl. No.: 11/736,679

(22) Filed: Apr. 18, 2007

(65) Prior Publication Data
US 2007/0247774 A1    Oct. 25, 2007

Related U.S. Application Data

(60) Provisional application No. 60/794,252, filed on Apr. 21, 2006.

(51) Int. Cl.
*H02H 9/08*    (2006.01)
(52) U.S. Cl. .................................. 361/93.1; 361/93.9
(58) Field of Classification Search ....... 361/93.7–93.9, 361/93.1
See application file for complete search history.

(56) References Cited

U.S. PATENT DOCUMENTS

| | | | | |
|---|---|---|---|---|
| 4,709,292 A | * | 11/1987 | Kuriyama et al. | 361/22 |
| 5,457,364 A | * | 10/1995 | Bilotti et al. | 318/434 |
| 5,712,550 A | * | 1/1998 | Boll et al. | 318/434 |
| 6,329,777 B1 | * | 12/2001 | Itabashi et al. | 318/434 |
| 6,940,736 B2 | * | 9/2005 | Jonsson | 363/71 |
| 7,177,130 B2 | * | 2/2007 | Ohshima | 361/93.9 |
| 7,227,391 B2 | * | 6/2007 | Araki et al. | 327/108 |
| 7,468,874 B1 | * | 12/2008 | Guo | 361/88 |
| 2003/0174005 A1 | | 9/2003 | Latham et al. | |
| 2005/0156644 A1 | | 7/2005 | Karnahan et al. | |

* cited by examiner

*Primary Examiner*—Danny Nguyen
(74) *Attorney, Agent, or Firm*—Farjami & Farjami LLP

(57) ABSTRACT

A circuit for providing over-current protection, the circuit including a gate driver circuit for controlling a bridge circuit including a half bridge stage having high and low switches. The circuit includes a feedback loop circuit for counting over-current indicators sensed during one or more consecutive PWM cycles; wherein when an over-current indicator is sensed, the low switch is turned OFF for duration of a first time period after which the low switch is turned back ON, to enable determination of an over-current condition where false noise signals are rejected thereby preventing circuit shutdowns due to false over-current condition.

9 Claims, 3 Drawing Sheets

NOISE IMMUNE OVER CURRENT PROTECTION WITH INHERENT CURRENT LIMITING FOR SWITCHING POWER CONVERTER

CROSS-REFERENCE TO RELATED APPLICATION

This application is based on and claims priority to U.S. Provisional Patent Application Ser. No. 60/794,252, filed on Apr. 21, 2006 and entitled NOISE IMMUNE OVER CURRENT PROTECTION WITH INHERENT CURRENT LIMITING FOR SWITCHING POWER CONVERTER, the entire contents of which are hereby incorporated by reference herein.

BACKGROUND OF THE INVENTION

The present invention relates to over-current protection circuits and more particularly to counting over-current events over one or more PWM periods to distinguish between noise and real over-current events.

Many power circuit applications require sensing of over-current conditions to protect components of the circuit. Such circuits typically comprise circuit 10, illustrated in FIG. 1, having a gate driver circuit or control IC 12 for controlling a bridge stage 14. The half bridge stage 14 is formed of high and low switches Q1 and Q2 connected at a node N. An inductor L1 is connected between the node N and a node M, which connects series connected capacitors C1 and C2. The switch Q2 is connected between the node N and a resistor $R_{sense}$.

Typically, when a signal A, as measured at the resistor $R_{sense}$, is provided to the control IC 12 for determining an over-current condition. A comparator circuit 18 may be used to compare the signal A to a user provided preset threshold $V_{TH}$. When the provided threshold $V_{TH}$ is exceeded, the control IC 12 enters a protection mode. This usually results in some modulation of a signal $V_g$ of the control IC 12 sent to the switch Q2 or, more typically, shutting down of the whole circuit 10.

The majority of the power circuits today operate in noisy environments. This noise includes switching noise from other functional circuit blocks, Electrostatic Discharge (ESD), or even thunder strike in automotive applications. Transient noise spikes can be on the order of 10 s or 100 s of ns and resemble over-current signals if processed.

Conventionally this is most easily accomplished by using a blanking filter circuit 16 after the over-current comparator. In this approach, the over-current signal B must last longer than a filtering time period allowed the blanking filter circuit 16 for registering the over-current signal B. Noise spikes shorter than a length of the filtering time period are automatically rejected. To prevent such misfire in the worst scenario, it is not sufficient for the blanking filter circuit's filtering time period to be longer than most noise spikes—the filtering time period must be longer than ALL noise spikes. This restriction results in a lengthy filtering time period, which has the following drawbacks:

1. The blanking filter circuit filtering time period can exceed the ON time of the switch Q2, especially when the duty ratio is low. This is a serious restriction in variable duty systems such as Class D amplifier where over-current protection is only active when the ON time is longer than the filtering time period.
2. If over-current condition occurs towards the end of the ON period, it will be filtered out and not registered until the next cycle.
3. A current in the inductor L1 is unchecked and switches un-protected for the length of the blanking filter circuit's filtering time period. The inductor current can ramp up to an unacceptable levels (saturation) when the blanking filter circuit's filtering time period becomes long.

In a very noisy environment where multiple channels are switching asynchronously, the length of the filtering time period required for the blanking filter circuit 16 can be so long that it exceeds the switching period, rendering the over-current protection method impractical.

Alternatively, in another approach, when over-current condition is detected, the switch current constant can be held to only invoke the shut down mode after a fixed time period (typically in the ms. range). This would avoid immediate reaction to noise signals. However, there is a chance that the system will stay in a constant current mode and never enter the shut down mode. This scenario can happen in audio applications where the length of the fixed time period is longer than a half cycle of an audio signal. This undesirable loophole can lead to overheating of the switch and an eventual system failure.

SUMMARY OF THE INVENTION

It is an object of the present invention to provide noise immunity, less restriction on PWM ON time and effective limitation of inductor current during over current.

It is another object of the present invention to effectively reject false noise signals and prevent unwanted circuit shutdowns due to over current.

A circuit is provided for providing over-current protection, the circuit including a gate driver circuit for controlling a bridge circuit including a half bridge stage having high and low switches. The circuit includes a feedback loop circuit for counting over-current indicators sensed during one or more consecutive PWM cycles; wherein when an over-current indicator is sensed, the low switch is turned OFF for duration of a first time period after which the low switch is turned back ON, to enable determination of an over-current condition where false noise signals are rejected thereby preventing circuit shutdowns due to false over-current condition.

Other features and advantages of the present invention will become apparent from the following description of the invention that refers to the accompanying drawings.

DETAILED DESCRIPTION OF EMBODIMENTS OF THE INVENTION

Figure 3:
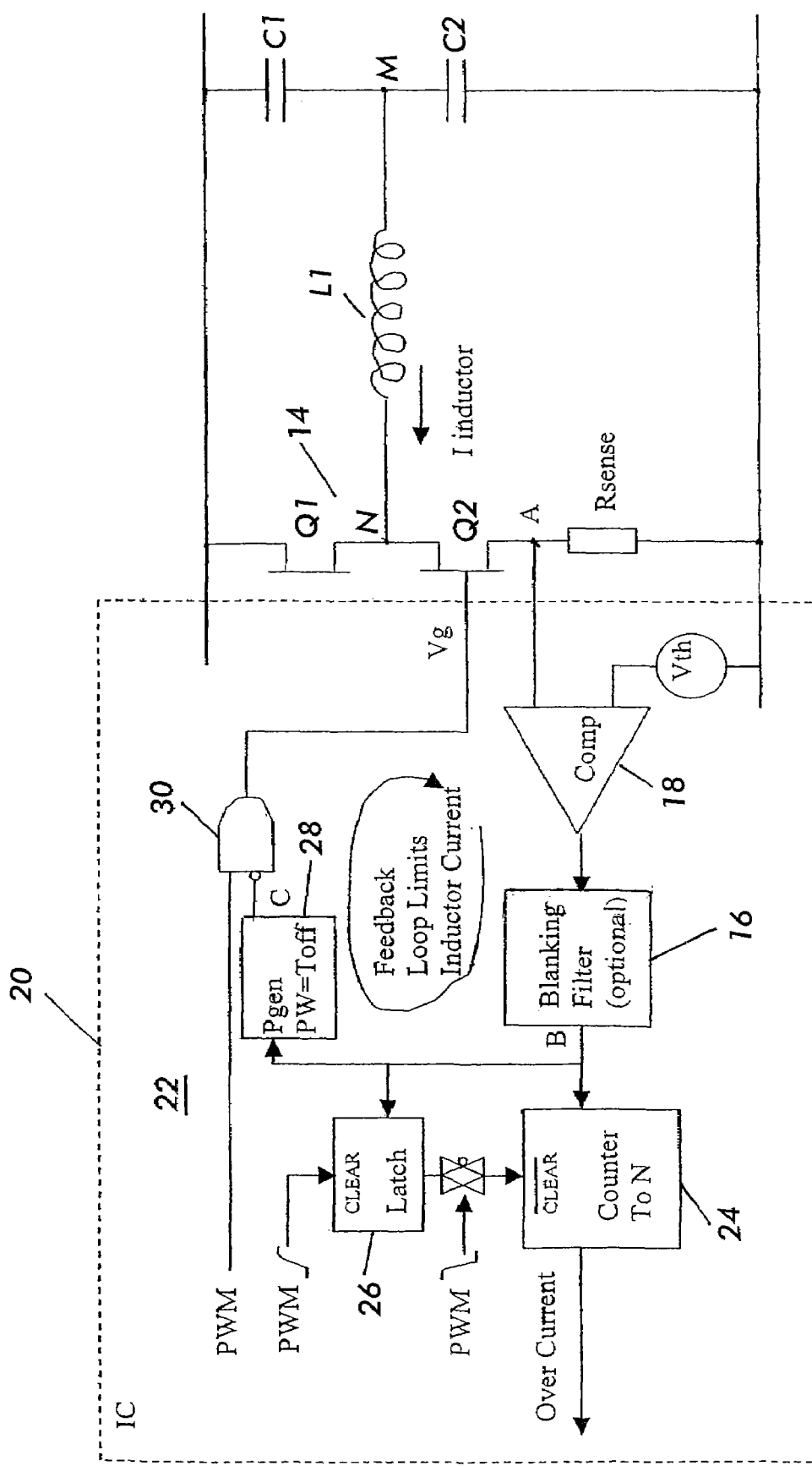
FIG. 3 is a block diagram of a half bridge circuit with a current sense and a blanking filter circuit over-current scheme of the present invention.

The present invention proposes an event based feedback loop for the circuit 20 illustrated in FIG. 3. The circuit 20 includes a gate driver circuit or control IC 22 for controlling a bridge stage 14, e.g., a half bridge stage having switches Q1 and Q2 connected at a node N. An inductor L1 is connected between the node N and a node M, which connects series connected capacitors C1 and C2. The switch Q2 is connected between the node N and a resistor $R_{sense}$.

Figure 4:
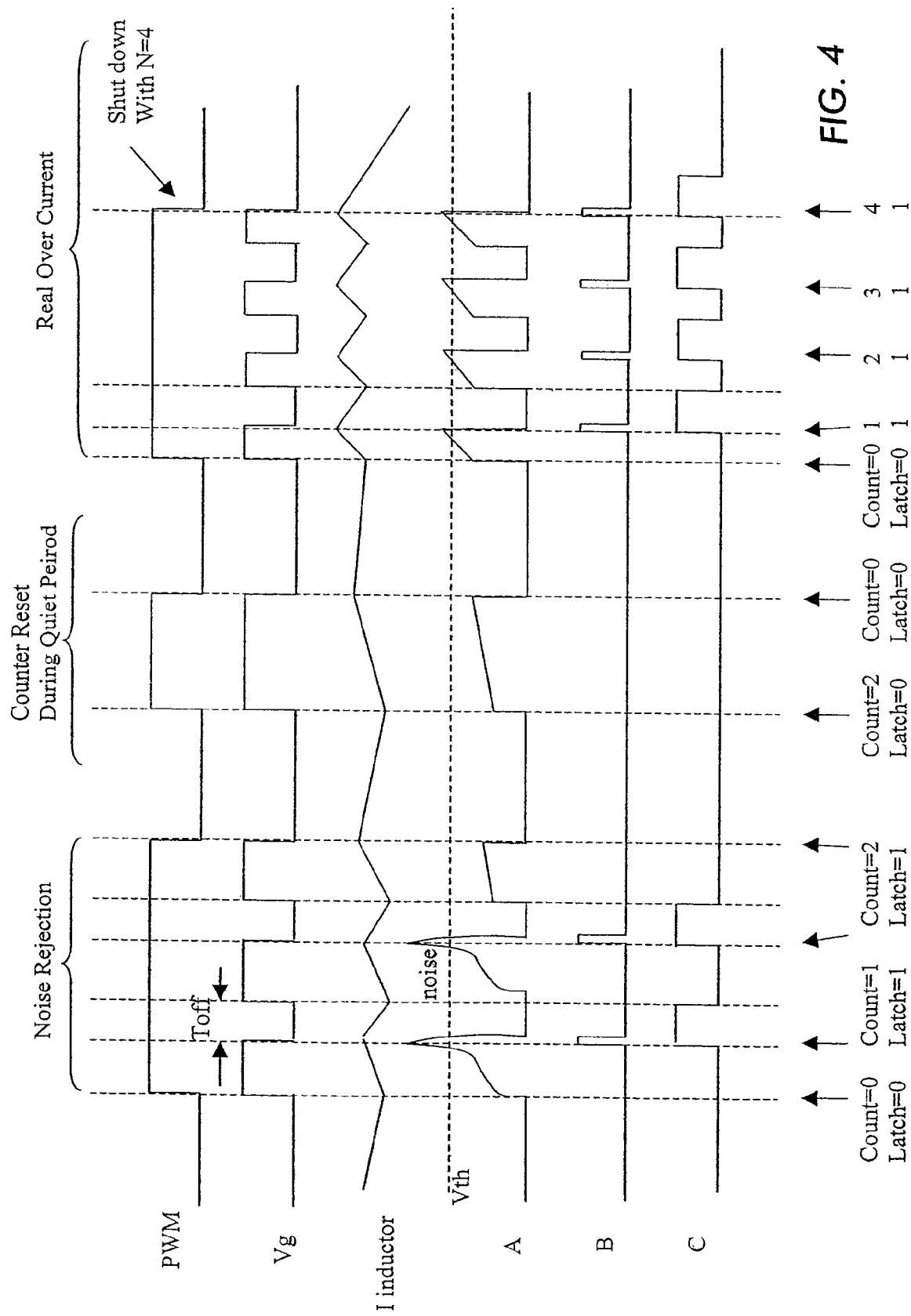
FIG. 4 is a timing diagram of the over-current scheme of FIG. 3.

As illustrated in FIG. 4, the event based feedback loop turns OFF the switch Q2 for a short fixed time period (Toff) when a comparator circuit 18 fires. The turning OFF of the switch Q2 enables determination of the over-current condition. A pulse generator circuit 28, when enabled generates a signal which is processed together with the PWM signal in an AND circuit 30 before being a controlling signal $V_g$ is sent to a gate of the switch Q2.

The comparator circuit 18 fires when it determines that a user preset threshold $V_{TH}$ is exceeded by a signal A sensed at the resistor $R_{sense}$. When, this happens, a signal B is sent to a counter circuit 24, a clear latch 26, and the pulse generator circuit 28. Turning OFF of the switch Q2 provides better protection by effectively holding the inductor current I constant prior to an actual shut down of the circuit 20 due to the over-current condition. The switch Q2 is then turned back ON for another over-current measurement.

To avoid shutting down of the circuit 20 due to false noise signals and prevent unwanted circuit shutdowns due to misfiring of the comparator circuit 18, the comparator circuit 18 firing events are counted by an event counter circuit 24. The firing events are counted until the number of firing events exceeds a pre-determined number N. Only then, when the number of firing events exceeds the pre-determined number N, does the circuit 20 register occurrence of the over-current condition and enters a shut down mode.

As illustrated in FIG. 4, The counter/latch circuit 26/24 scheme allows the counting of the firing events to be extended over consecutive PWM cycles. Specifically, the watchdog latch circuit 26 is used to reset the event counter maintained by the counter circuit 24 when no firings of comparator circuit 18, i.e., signal B is OFF, occur for some set time i.e., during one PWM ON period.

Figure 1:
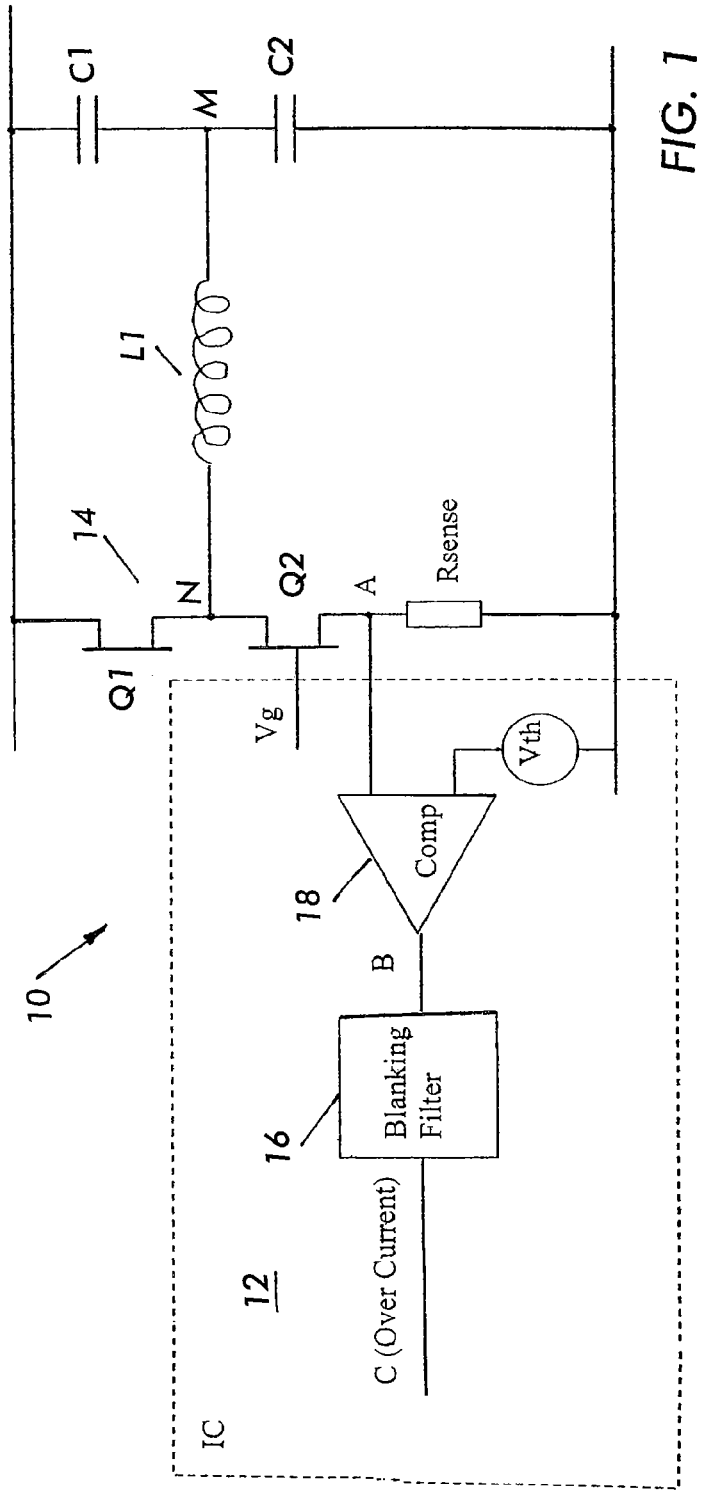
FIG. 1 is a block diagram of a conventional half bridge circuit with a current sense and a blanking filter circuit over-current scheme.
Figure 2:
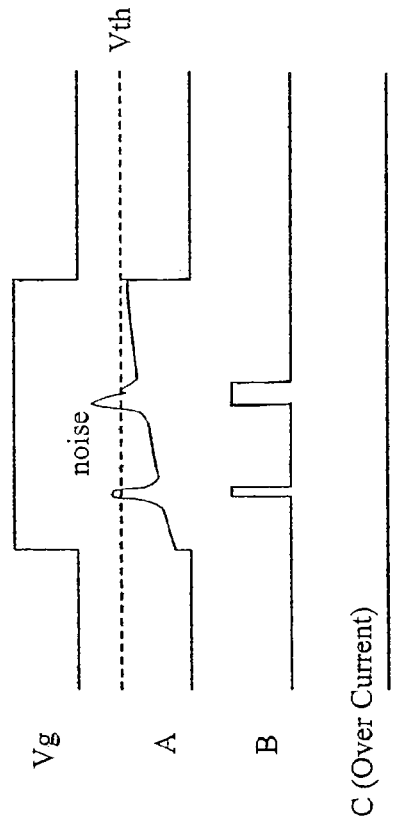
FIG. 2 is a timing diagram of the conventional over-current scheme of FIG. 1.

During a real over-current event, the switch Q2 is repeatedly turned OFF and ON until the event counter of the counter circuit 24 reaches a pre-determined number N. For example, FIG. 4 illustrates the circuit 20 entering a shut down state when the event counter is 4. This, effectively keeps a current I of an inductor L1 constant and is much safer than when a filtering time period is used as in circuit 10 (FIG. 1), where the current I through the inductor L1 keeps increasing during the filtering time period.

In the circuit 20, single or multiple noise spikes, small or large, will be rejected since they are unlikely to cause the counter to reach the pre-determined number N before the counter circuit 24 is reset during a quiet period.

The filtering time period for circuit 22 may be much reduced since individual noise spikes can now be tolerated. Moreover, counting of the spikes can be spread over consecutive PWM ON periods, allowing application of the over-current condition detection of the present invention in high frequency or short duty situations where PWM ON time is minimal.

The over-current condition detection scheme of the present invention counts over-current events over consecutive PWM cycles only up to the pre-determined number N cycles. Therefore, the system does not stay in constant current mode for a longer time.

The over-current condition detection scheme of the present invention is flexible and can be tailored to fit a variety of systems by adjusting The filtering time period of a blanking filter circuit 16 to be greater than or equal to 0;

The number of over-current events to be counted, i.e., the pre-determined number N, A watch dog time period (default=one PWM ON period), and A switch turn OFF time (Toff).

Although the present invention has been described in relation to particular embodiments thereof, many other variations and modifications and other uses will become apparent to those skilled in the art. It is preferred, therefore, that the present invention not be limited by the specific disclosure herein.

What is claimed is:

1. A circuit for providing over-current protection, the circuit including a gate driver circuit for controlling a bridge circuit including a half bridge stage having high and low switches, the circuit comprising:

a feedback loop circuit for counting over-current indicators sensed during one or more consecutive PWM cycles, wherein when an over-current indicator is sensed, the low switch is turned OFF for duration of a first time period after which the low switch is turned back ON, to enable determination of an over-current condition whereby false over-current conditions due to noise signals are rejected thereby preventing circuit shutdowns due to the false over-current condition, the feedback loop circuit comprising:

a comparator circuit for generating a comparison signal when a first current exceeds a user provided preset threshold and a pulse generator circuit coupled to the output of the comparator circuit for generating a disabling signal, wherein, when the comparison signal is generated, the low switch is turned OFF for the first time period by the pulse generator circuit after which the low switch is turned back on;

a counter circuit for counting a number of occurrences of the comparison signal, the number of occurrences of the comparison signal in excess of a predetermined number indicating an over-current condition; and a latch circuit for resetting the counter circuit when the comparison signal does not occur for a second time period.

2. The circuit of claim 1, wherein the bridge circuit further comprises:

high and low capacitors parallel connected to the bridge stage;

an inductor connected at a first node between the high and low switches and a second node between the high and low capacitors; and a resistor series connected to the low switch for sensing the first current from the inductor through the low switch.

3. The circuit of claim 1, wherein the second time period is one PWM ON period.

4. The circuit of claim 1, wherein the over-current condition prompts the circuit to enter a shut down mode.

5. The circuit of claim 1, wherein the feedback loop further comprises:

an AND circuit connected to a gate of the low switch for processing the disabling signal and a PWM signal to control the low switch, wherein the pulse generator circuit is enabled when the comparison signal is generated.

6. The circuit of claim 1, wherein the PWM signal has a high frequency or short duty cycle and minimal PWM ON time.

7. The circuit of claim 1, wherein noise is distinguished over over-current events by counting over-current events over one or more PWM periods.

8. A circuit for providing over-current protection, the circuit including a gate driver circuit for controlling a bridge circuit including a half bridge stage having high and low switches, the circuit comprising:

a feedback loop circuit for counting over-current indicators sensed during one or more consecutive PWM cycles, wherein when an over-current indicator is sensed, the low switch is turned OFF for duration of a first time period after which the low switch is turned back ON, to enable determination of an over-current condition whereby false over-current conditions due to noise signals are rejected thereby preventing circuit shutdowns due to the false over-current condition, the feedback loop circuit comprising:

a comparator circuit for generating a comparison signal when a first current exceeds a user provided preset threshold, wherein, when the comparison signal is generated, the low switch is turned OFF;

a counter circuit for counting a number of occurrences of the comparison signal, the number of occurrences of the comparison signal in excess of a predetermined number indicating an over-current condition; and a latch circuit for resetting the counter circuit when the comparison signal does not occur for a second time period, further comprising a blanking filter circuit for receiving the comparison signal, the blanking filter circuit having a third time period for registering the comparison signal, wherein the blanking filter circuit provides the comparison signal to the pulse generator, counter, and latch circuits.

9. The circuit of claim 8, wherein the third time period is greater than or equal to 0.

* * * * *